United States Patent [19]

Randall et al.

[11] Patent Number: 4,972,004
[45] Date of Patent: Nov. 20, 1990

[54] POLYISOCYANATE COMPOSITIONS AND FOAM COMPRISING MDI, POLYMERIC MDI, AND A PREPOLYMER OF MDI

[75] Inventors: David Randall, Erps-Kwerps; Anthony Cunningham, Bertem, both of Belgium

[73] Assignee: Imperial Chemical Industries PLC, London, England

[21] Appl. No.: 280,968

[22] Filed: Dec. 7, 1988

[30] Foreign Application Priority Data

Dec. 10, 1987 [GB] United Kingdom ............... 8728886

[51] Int. Cl.$^5$ ............................................. C08G 18/73
[52] U.S. Cl. ................................. 521/159; 521/160; 521/902; 252/182.22; 252/182.2
[58] Field of Search .................. 252/182.22, 182.2; 521/159, 160

[56] References Cited

U.S. PATENT DOCUMENTS

| | | | |
|---|---|---|---|
| 4,031,026 | 6/1977 | Ibbotson | 252/182.22 |
| 4,261,852 | 4/1981 | Carroll et al. | 252/182.22 |
| 4,419,261 | 12/1983 | Takahashi | 252/182.22 |
| 4,478,960 | 10/1984 | Buethe et al. | 521/161 |
| 4,544,763 | 10/1985 | Narayan | 252/182.2 |
| 4,707,502 | 11/1987 | Rasshofer et al. | 521/161 |
| 4,814,103 | 3/1989 | Potter et al. | 252/182.22 |
| 4,853,417 | 8/1989 | Weigand et al. | 521/159 |

*Primary Examiner*—John Kight, III
*Assistant Examiner*—Dennis R. Daley
*Attorney, Agent, or Firm*—Cushman, Darby & Cushman

[57] ABSTRACT

Polyisocyanate composition comprising:
  (A) 30-45% by weight of disphenylmethane diisocyanates;
  (B) 28-67% by weight of polymethylene polyphenylene polyisocyanates having more than two free isocyanate groups in the molecule; and
  (C) 3-27% by weight of a prepolymer from a diphenylmethane diisocyanate and a compound containing at least two isocyanate-reactive groups and having a molecular weight below 1000; the % by weight being calculated on the total amount of (A), (B) and (C) present in the composition; the number average isocyanate functionality of the composition being at least 2.3.

The compositions show improved miscibility with rigid foam polyols resulting in processing benefits. Foams made from these compositions exhibit smaller cell size and lower thermal conductivity.

10 Claims, No Drawings

POLYISOCYANATE COMPOSITIONS AND FOAM COMPRISING MDI, POLYMERIC MDI, AND A PREPOLYMER OF MDI

This invention relates to polyisocyanate compositions based on polymethylene polyphenylene polyisocyanate compositions and to their use in the manufacture of rigid polyurethane foams.

The manufacture of rigid polyurethane foams by reacting an organic polyisocyanate with a branched polyol having a high hydroxyl content in conjunction with a foaming agent is well established. Some of the most frequently used polyisocyanates in rigid foam production are the polymethylene polyphenylene polyisocyanate compositions commonly referred to as "crude" or "polymeric" MDI. In general, these polyisocyanates are not immediately miscible with the highly hydroxylated polyols used and the initial reaction mixture can vary between a coarse dispersion of one component in the other and a very fine emulsion. As the catalysed reaction between the isocyanate and the polyol proceeds, the dispersion droplets decrease in diameter and eventually disappear, providing a type of "processing" miscibility.

It has now been found out that specific polyisocyanate compositions based on diphenylmethane diisocyanates, polymethylene polyphenylene polyisocyanates and certain prepolymers are virtually instantaneously miscible with rigid foam polyols, resulting in easier processing and in foams having significantly improved properties. Thus, the new compositions enable reaction mixtures which have previously required very high efficiency mixing equipment, for example those containing sucrose based polyols, to be successfully processed even under quite poor mixing conditions.

Furthermore, the foams obtained have smaller cells and lower thermal conductivities making them more useful insulation materials. In addition, foams may be made from the polyisocyanate composition according to the present invention showing reduced friability, better flow, shorter demould times, decreased minimum stable density and/or increased strength.

Polyisocyanate compositions comprising prepolymers have been disclosed in GB Nos. 2 021 605 and 1 444 192 and German Patent Application No. 2 513 793. These disclosures in fact are concerned with compositions having a low isocyanate functionality and a high content of compounds having two free isocyanate groups in the molecule, said compositions are intended for polyurethane foams having a certain degree of flexibility. European Patent Application No. 10 850 discloses polyisocyanate compositions comprising prepolymers made from diols or triols having a hydroxyl equivalent weight of 750–3000. European Patent Application No. 93 357 discloses polyisocyanate compositions comprising prepolymers in a very broad way for binding wood-chips and the like.

The present invention is concerned with a polyisocyanate composition comprising:
 (A) 30–45% by weight of diphenylmethane diisocyanates;
 (B) 28–67% by weight of polyphenylene polyisocyanates having more than two free isocyanate groups in the molecule; and
 (C) 3–27% by weight of a prepolymer from a diphenylmethane diisocyanate and a compound containing at least two isocyanate-reactive groups and having a molecular weight below 1000; the % by weight being calculated on the total amount of (A), (B) and (C) present in the composition; the number average isocyanate functionality of the composition being at least 2.3.

The invention further is concerned with a process for preparing such compositions. Still further the invention is concerned with a foam-forming system comprising such a polyisocyanate composition, processes for making rigid foams from such systems and rigid foams prepared from such systems.

For a better understanding the following terms in the present application have the following meaning throughout the application (except the introductory part describing the prior art):
 Prepolymer: compounds made from a diphenylmethane diisocyanate and a compound containing at least two isocyanate-reactive groups in such a way that virtually no free isocyanate-reactive groups remain unreacted; diphenylmethane diisocyanate is not comprised in this definition.
 Prepolymer composition: prepolymer + excess diphenylmethane diisocyanates used for preparing the prepolymer.
 Polymethylene polyphenylene polyisocyanates: this term does not include diphenylmethane diisocyanates but only polymethylene polyphenylene polyisocyanates having more than 2 isocyanate groups in the molecule.
 Polymethylene polyphenylene polyisocyanate compositions: this term includes diphenylmethane diisocyanates together with polymethylene polyphenylene polyisocyanates having more than 2 isocyanate groups in the molecule.
 Diphenylmethane diisocyanate: this term does not include prepolymers.
 Functionality: number average isocyanate functionality.
 Polyisocyanate composition: composition according to the invention.
 Total diisocyanate content: the amount % by weight % diphenylmethane diisocyanate in the polyisocyanate composition including the amount which reacted so as to form the prepolymer.

The functionality of the polyisocyanate composition preferably is at least 2.4. The upper limit of the functionality generally will be at most 2.9 and preferably at most 2.85. Hence the functionality of the polyisocyanate composition is 2.3–2.9 and preferably 2.4–2.85.

The amount of polymethylene polyphenylene polyisocyanates in the polyisocyanate composition preferably is 33–66% w and the amount of prepolymer preferably ranges from 4 to 23% w.

The molecular weight of the compound containing at least two isocyanate-reactive groups preferably is at most 500 and more preferably at most 200.

The isocyanate-reactive compound used in the preparation of the prepolymer is preferably a diol or mixture of diols but may, if desired, be a diamine or an aminoalcohol or another compound having two isocyanate-reactive groups.

Particularly suitable diols include alkylene or oxyalkylene diols having molecular weights of at most 200, for example ethylene glycol, diethylene glycol, propane-1,2-diol, propane-1,3-diol, butane-1,3-diol, butane-1,4-diol, hexane-1,6-diol, tripropylene glycol and mixtures thereof. Other diols include higher polypropylene glycols and polyethylene glycols having molecular weights below 1000.

The diphenylmethane diisocyanate used in the preparation of the prepolymer may be any mixture of the 4,4'- 2,4'- and 2,2'40 -isomers or a pure isomer and preferably contains from 70 to 100% of the 4,4'40 -isomer and from 0 to 30% of the 2,4'-isomer. The diphenylmethane diisocyanate may contain a slight amount of uretonimine-modified diphenylmethane diisocyanates.

The total diisocyanate content of the polyisocyanate composition preferably ranges from 35-65% weight, calculated on the amount of (A), (B) and (C) in the composition.

If desired, the polyisocyanate composition may contain other - modified - polyisocyanates like uretonimine-modified ones of the types described in the prior art.

In addition the polyisocyanate composition may contain additives, auxiliaries, ingredients and the like which conventionally may be added to polyisocyanate compositions for preparing rigid foams.

The prepolymer may be prepared using conventional techniques, for example by reacting the diphenylmethane diisocyanate with the isocyanate-reactive compound at temperatures of from 70° to 90° C. The relative amounts of the diisocyanate and the isocyanate-reactive compound are such that no unreacted isocyanate-reactive groups remain after the formation of the prepolymer. In general this means that the number of isocyanate groups is at least two times the number of isocyanate-reactive groups in the reaction mixture. Preferably 0.15-0.29 molar portions of the isocyanate-reactive compound per molar portion of diphenylmethane diisocyanate are used. In most cases an amount of unreacted diphenylmethane diisocyanate will remain once the prepolymer has been formed. The prepolymer or the prepolymer composition, prepared accordingly, is combined with a polymethylene polyphenylene polyisocyanate composition having a functionality of at least 2.5 and comprising 25-45% by weight of diphenylmethane diisocyanates in such relative amounts that the polyisocyanate composition comprises (A), (B) and (C) in the relative amount as indicated previously and that the functionality of the polyisocyanate composition is at least 2.3. This procedure is routine for those skilled in the art. The actually employed relative amounts of the prepolymer composition and the polymethylene polyphenylene polyisocyanate composition are mainly governed by the amount of diphenylmethane diisocyanates in these compositions.

Typically a prepolymer composition comprising 46-50% by weight of diphenylmethane diisocyanates may be combined with a polymethylene polyphenylene polyisocyanate composition comprising 30-40% by weight of diphenylmethane diisocyanates and having a functionality of 2.7-2.9 in a weight ratio of 10-50 of prepolymer composition to 90-50 of polymethylene polyphenylene polyisocyanate composition. The combination may be conducted in conventional ways, like by means of blending.

The employed polymethylene polyphenylene polyisocyanate composition comprising 25-45% by weight of diphenylmethane diisocyanates and having isocyanate functionalities of at least 2.5 are commercially available materials manufactured by the phosgenation of polyamine mixtures obtained by the acid condensation of aniline and formaldehyde in appropriate proportions.

The polyisocyanate compositions of the invention may be reacted with rigid foam polyols under conventional foam forming conditions to give high quality rigid polyurethane foams. Suitable polyols are branched polyethers and/or polyesters having hydroxyl numbers of from 250 to 650, which have been fully described in the polyurethane literature.

If desired, these polyols may be used in conjunction with polyols of lower hydroxyl numbers, for example 25 to 150. Isocyanate indices may vary from about 90 to about 1500 or even higher.

Conventional foam forming conditions include the use of blowing agents such as trichlorofluoromethane and/or water, catalysts, for example tertiary amines and tin compounds, surface active agents, flame retardants, fillers, and, if desired, trimerisation catalysts. The foams may be formed as block in situ, for example in refrigerator cabinets, or in the form of laminates.

Hence the present invention is concerned with a process for preparing rigid polyisocyanurate and polyurethane foams which comprises reacting a polyisocyanate composition according to the present invention under foam-forming conditions with a branched polyether and/or polyester polyol having a hydroxyl number of from 250–650.

The invention also covers foam-forming systems suitable for performing the foaming method according to the invention. The expression "system" as used herein refers to a set of individual components which are produced and/or marketed with the obvious purpose to be suitable for use in combination with each other to perform a specific process or to achieve specific performances. The foam-forming systems according to the present invention comprise a polyisocyanate composition according to the present invention and a branched polyether and/or polyester polyol having a hydroxyl number of from 250–650. One or both components of the system may comprise one or more of the auxiliaries and additives mentioned before. Such auxiliaries and additives may be present in the system separately from the polyisocyanate composition and/or the polyol. The invention further is concerned with rigid polyurethane and polyisocyanurate foams prepared from these systems.

The polyisocyanate compositions according to the present invention are of particular value for use in the production of rigid polyurethane foams having densities of less than 100 kg.m$^{-3}$ and preferably between 20 and 50 kg.m$^{-3}$. In view of the low functionalities of the prepolymers, it is surprising that the foams have shorter demould times than corresponding foams obtained from isocyanate compositions containing no prepolymer. Furthermore, in view of the low molecular weight polyols present in the prepolymers, it is surprising that the foams have reduced friability.

The invention is illustrated but not limited by the following Examples:

EXAMPLE 1

An isocyanate composition was produced which contained 2.4 parts of a 4,4'-diphenyl methane diisocyanate in which 25–30 wt % by weight of the isocyanate groups have been converted into a uretonimine form (marketed by ICI under the trade name 'SUPRASEC' VM 020), 50 parts of a polymethylene polyphenylene polyisocyanate having a functionality of 2.7 and a content of diphenylmethane diisocyanate of 40% weight and between 29.5 and 31.0% by weight of isocyanate groups, and a prepolymer obtained by reacting 42.55 parts of a mixture of 4,4′ -diphenylmethane diisocyanate and 2,4′ -diphenylmethane diisocyanate (97.4% and 2.6%) with 5.05 parts of a mixture of propylene glycol, 1,3 butane diol and tripropylene glycol (0.8:0.8:1.0 molar ratio). The composition comprised 44% weight diphenylmethane diisocyanates, 31% weight of polymethylene polyphenylene polyisocyanates and 25% weight of prepolymer; the functionality of the composition was 2.36.

EXAMPLE 2

Example 1 was repeated with a polymethylene polyphenylene polyisocyanate having a functionality of 2.9 and a content of diphenylmethane diisocyanate of 30% weight. The composition obtained comprised 39% weight diphenylmethane diisocyanates, 36% weight polymethylene polyphenylene polyisocyanate and 25% weight of prepolymer ; the functionality of the composition wa 2.43.

EXAMPLE 3

An isocyanate composition was produced which contained 0.48 part of a 4,4′- diphenylmethane diisocyanate in which 25-30 weight % of the isocyanate groups have been converted into a uretonimine form (marketed by ICI under the trade name 'SUPRASEC' VM 020), 90 parts of a polymethylene polyphenylene polyisocyanate having a functionality of 2.7 and a content of diphenylmethane diisocyanate of 40% weight and between 29.5 and 31.0% by weight of isocyanate groups, and a prepolymer obtained by reacting 8.51 parts of a mixture of 4,4′0 -diphenylmethane diisocyanate and 2,4′0 -diphenylmethane diisocyanate (97.4% and 2.6%) with 1.01 parts of a mixture of propylene glycol, 1,3-butane diol and tripropylene glycol (0.8:0.8:1.0 molar ratio).

The composition comprised 41% weight diphenylmethane diisocyanates, 54% weight of polymethylene polyphenylene polyisocyanates and 5% weight of prepolymer ; the functionality of the composition was 2.62.

EXAMPLE 4

Example 3 was repeated with the polymethylene polyphenylene polyisocyanate employed in Example 2. The composition obtained comprised 31% weight diphenylmethane diisocyanates, 64% weight polymethylene polyphenylene polyisocyanates and 5% weight prepolymer; the functionality of the composition was 2.81.

EXAMPLE 5

A polyol blend consisting of 31.07 parts of a polyol based on sucrose and diethanolamine with a hydroxyl value of 575 mg KOH/g, 4.27 parts of trichloropropyl phosphate, 0.36 parts of a siloxane oxyalkylene block copolymer surfactant, 0.18 part of water, 1.02 parts of a mixture of catalysts based on N,N-dimethylcyclohexylamine and dibutyl tin dilaurate and 12.30 parts of trichlorofluoromethane was mixed with 50.80 parts of polymeric MDI having a functionality of 2.7. The polyol blend and the isocyanate were mixed using a Viking Mark VA air gun mixer equipped with a Bray 50 nozzle. The combined output rate was 4.8 kg/min and the chemical temperature 20° C. The mixture was dispensed on to a Viking laminator and produced a continuous paper faced laminate 120 cm wide and 3 cm thick of average density 35 kgm$^{-3}$. The physical properties of the laminate were measured.

In a second experiment, the polymeric MDI in the above formulation was replaced with 53.35 parts of an isocyanate composition of the type described in Example 2 and the amount of polyol and catalyst were adjusted to 28.34 parts and 1.20 parts respectively in order to maintain the index and reaction profile. The second mixture was used to produce a paper faced laminate under identical condition to the first laminate. The physical properties of the two laminates were compared. Using an isocyanate of the type described in Example 2 resulted in better processing due to earlier cure ex conveyor, finer cell size (0.22 versus 0.19 mm isotropic diameter), reduced friability (2.1 versus 1.2%) and lower initial lambda - value (18.2 versus 17.1 mWatts.m$^{-1}$.°K$^{-1}$ at 10° C.).

EXAMPLE 6

A polyol blend consisting of 100 parts of a polyol based on sucrose with a hydroxyl value of 440 mg KOH/g, 1.5 parts of a siloxane oxyalkylene block copolymer surfactant, 2.0 parts of water, 2.8 parts of a catalyst based on N,N dimethylcyclohexylamine and 37.5 parts of trichlorofluoromethane was mixed with 143.7 parts of polymeric MDI of functionality 2.7. The polyol blend and the isocyanate were mixed using a Kraus Maffei Rimstar 40/20 with MK 12/16 - UL - 2K head running with 1.4 mm injectors. The output rate was 17.3 kg/min, the line pressure 150 bar and the chemical temperature 22° C. The physical properties of the resulting foam and its processability were measured.

In a second experiment, the polymeric MDI in the above formulation was replaced by 164.4 parts of an isocyanate composition of the type described in Example 1, and the amount of trichlorofluoromethane was adjusted to 42.7 parts to maintain the same density. The foam was produced in the same way as in the first experiment. The physical properties and processability were measured and compared with the foam produced in the first experiment. Using an isocyanate composition of the type described in Example 1 resulted in a decrease in the amount required to fill a U-shaped mould (490 versus 470 g) and a decrease in the resultant edge effect.

(These two results taken together would normally be interpreted as an improvement in flow). There was a decrease in the minimum stable density (34 versus 32.8 kg.m$^{-3}$), a decrease in the demould time (10.8 versus 10.6 min on a 9 cm thick panel) and an increase in the compressive strength (86 versus 102 kPa, mean strength 28 kg.m$^{-3}$). There was a decrease in the friability (4.9 versus 1.9), a decrease in the cell size (0.58 versus 0.45) and a decrease in the initial lambda - value (19.9 versus 16.8).

EXAMPLE 7

A polyol blend consisting of 27.62 parts of a polyester polyol with a hydroxyl value of 295 mg KOH/g (marketed by ICI under the trade name Daltolac P520), 1.69 parts of trichloro propyl phosphate, 0.34 parts of a siloxane oxyalkylene block copolymer surfactant, 1.2 parts of a mixture of catalysts based on N,N dimethylcyclohexylamine and potassium acetate, and 14.0 parts of trichlorofluoromethane was mixed with 55.15 parts of polymeric MDI of functionality 2.7. The physical properties of the resulting foam were measured.

In a second experiment, the polymeric MDI in the above formulation was replaced by 58.03 parts of an isocyanate composition of the type described in Example 1, and the amount of polyol and catalyst were adjusted to 24.64 parts and 1.3 parts respectively in order to maintain the index at 250 and to maintain the same reaction profile. The physical properties of the two foams were compared. Using an isocyanate of the type described in Example 1 resulted in earlier cure, finer cell size and reduced friability.

EXAMPLE 8

A polyol blend consisting of 6.86 parts of a polyol based on sucrose and diethylene glycol with a hydroxyl value of 310 mg KOH/g, 0.40 parts of a siloxane oxyalkylene block copolymer surfactant, 2.7 parts of a catalyst composition containing potassium 2-ethylhexoate and calcium 2-ethylhexoate dissolved in polypropylene glycol 400 and 14.50 parts of trichlorofluoromethane was mixed with 75.54 parts of polymeric MDI. The physical properties of the resulting foam were measured.

In a second experiment, the polymeric MDI in the above formulation was replaced with 74.88 parts of an isocyanate composition of the type described in Example 2 and the amount of polyol, catalyst and trichlorofluoromethane were adjusted to 5.31 parts, 4.4 parts and 15.0 parts respectively in order to maintain the index at 1300 and keep the same reaction profile and density. The physical properties of the two foams were compared. Using an isocyanate of the type described in Example 2, resulted in better miscibility, higher compressive strength and reduced friability.

EXAMPLE 9

A foam was made from the composition obtained in Example 4 and a polyol blend similar to the one used in Example 7 in a way similar to the way the foam was made in Example 7. Likewise a foam was made from polymeric MDI (functionality 2.9). The foam according to the present invention showed a cell-size of 0.26 mm, while the cell-size of the conventional foam was 0.30 mm.

We claim:
1. Polyisocyanate composition comprising:
   (A) 30-45% by weight of diphenylmethane diisocyanates;
   (B) 28-67% by weight of polyphenylene polyisocyanates having more than two free isocyanate groups in the molecule; and
   (C) 3-27% by weight of a prepolymer from a diphenylmethane diisocyanate and a compound containing at least two isocyanate-reactive groups and having a molecular weight below 1000; the % by weight being calculated on the total amount of (A), (B) and (C) present in the composition; the number average isocyanate functionality of the composition being at least 2.3.

2. Composition according to claim 1, characterised in that the functionality is at least 2.4.

3. Composition according to claim 1, characterised in that the molecular weight of the isocyanate reactive compound is at most 500.

4. Composition according to claim 1, characterised in that the amount of (B) is 33-66% by weight.

5. Composition according to claim 1, characterised in that the amount of (C) is 4-23% by weight.

6. Process for preparing a composition according to claim 1, characterised in that a polymethylene polyphenylene polyisocyanate composition, comprising 25-45% by weight by diphenylmethane diisocyanates and having a number average isocyanate functionality of at least 2.5, and a prepolymer composition, obtained by reacting a diphenylmethane diisocyanate with a compound containing at least two isocyanate-reactive groups and having a molecular weight below 1000 in such relative amounts that no unreacted isocyanate-reactive groups remain after the reaction has been carried out, are combined in such relative amounts that the polyisocyanate composition comprises (A), (B) and (C) in the relative amounts as indicated in claim 1 and that the functionality of the polyisocyanate composition is at least 2.3.

7. A foam-forming system comprising:
   (a) a polyisocyanate composition according to claim 1, and
   (b) a branched polyether and/or polyester polyol having a hydroxyl number of from 250 to 650.

8. A process for preparing a rigid polyurethane foam which comprises reacting a polyisocyanate composition according to claim 1 under foam-forming conditions with a branched polyether and/or polyester polyol having a hydroxyl number of from 250 to 650.

9. A process for preparing a rigid polyisocyanurate foam which comprises reacting a polyisocyanate composition according to claim 1 under foam-forming conditions with a branched polyether and/or polyester polyol having an hydroxyl number of from 250 to 650.

10. A rigid polyurethane and polyisocyanurate foam prepared from a foam-forming system as claimed in claim 7.

* * * * *